Feb. 21, 1967  W. E. DUNN  3,304,734
CONTINUOUS CRYSTALLIZERS
Filed Jan. 20, 1966  2 Sheets-Sheet 1
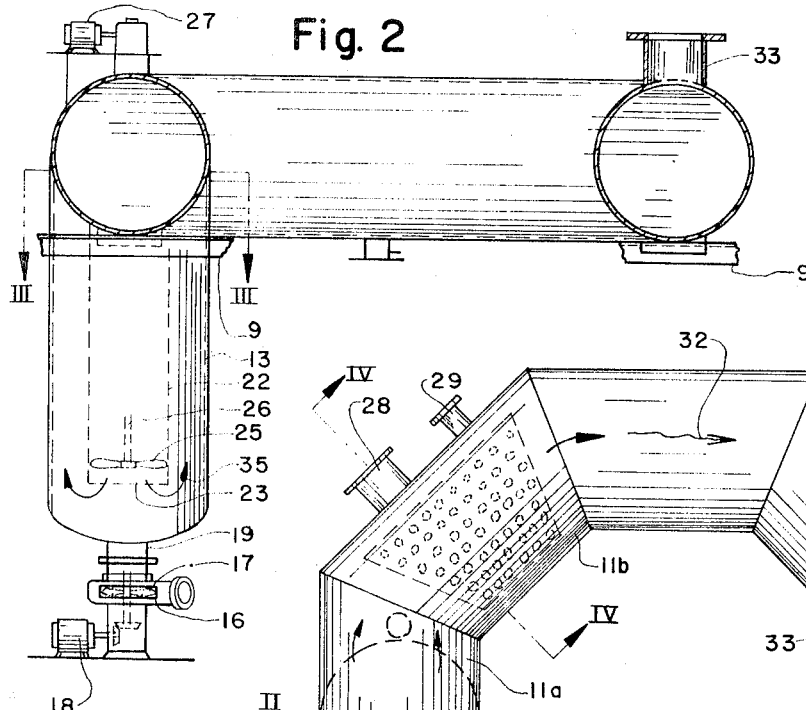
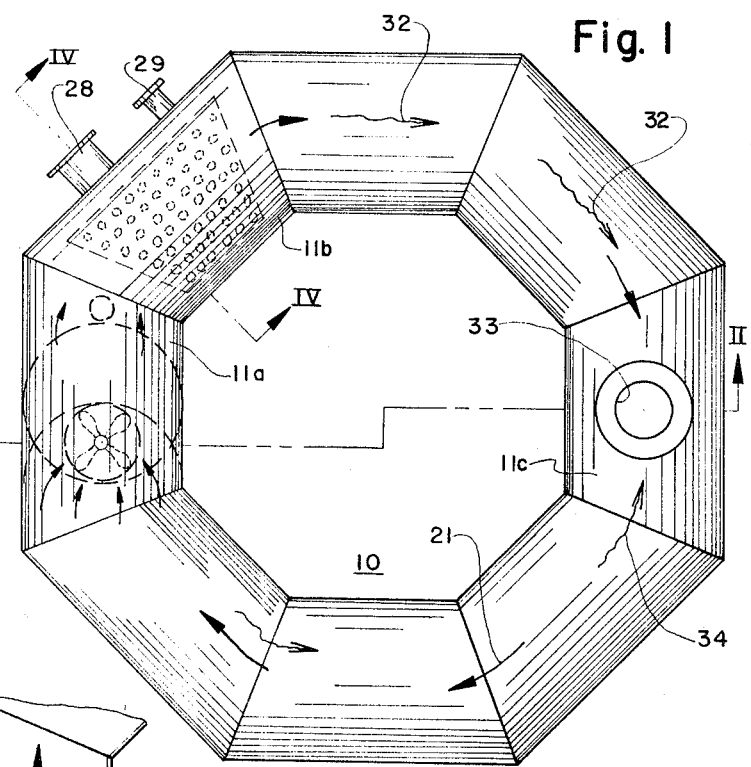
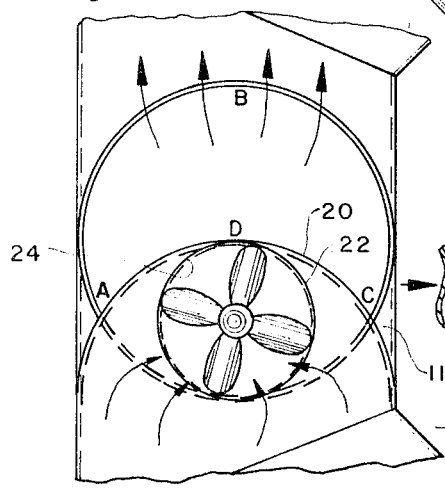
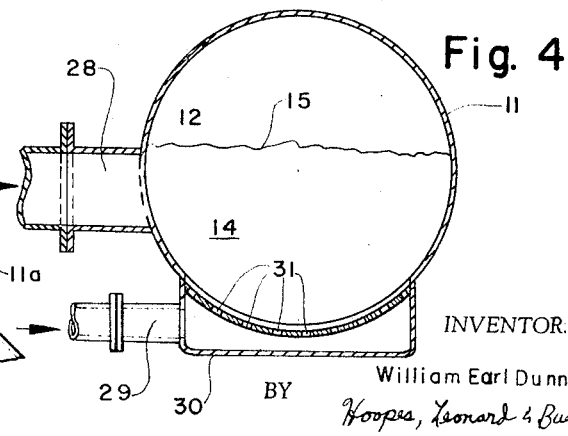
INVENTOR.
William Earl Dunn
BY Hoopes, Leonard & Buell
his Attorneys Feb. 21, 1967   W. E. DUNN   3,304,734
CONTINUOUS CRYSTALLIZERS
Filed Jan. 20, 1966   2 Sheets-Sheet 2

INVENTOR.
William Earl Dunn
BY Hoopes, Leonard & Buell
his Attorneys

United States Patent Office 3,304,734
Patented Feb. 21, 1967

1

3,304,734
CONTINUOUS CRYSTALLIZERS
William Earl Dunn, Pittsburgh, Pa., assignor to Blaw-Knox Company, Pittsburgh, Pa., a corporation of Delaware
Filed Jan. 20, 1966, Ser. No. 521,777
6 Claims. (Cl. 62—123)

This invention relates to continuous crystallizing from solutions by cooling in direct contact with a vaporizable refrigerant. The crystals may be formed from either the solvent or solute component of a solution, or by partial crystallization of a single component liquid, but the invention is particularly described as applied to a partial freezing system in which ice crystals are formed as a step in the process of production of potable water from saline water, such as sea or brackish water, utilizing an immiscible vaporizable organic liquid to effect partial freezing of the saline water. The invention is, however, applicable to any continuous crystallizing of one component from solution by freezing in direct contact with a vaporizable refrigerant whether the crystals are formed from the solvent or the solute component or phase, or to partial crystallization of single component systems. More particularly the invention relates to apparatus by which continuous crystallization can readily be performed, of relatively large capacity particularly where large rates of flow are involved.

This invention results from work done under a contract with the Office of Saline Water in the Department of Interior entered into pursuant to the Saline Water Act, 42 U.S.C. 1951–1958g.

In apparatus and method of the system of this invention for the production of useful fresh water, such as potable water, from unusable sea or brackish waters, many advantages are present relative to numerous prior practices utilizing the same or similar ingredients as set forth in many reports published in recent years by the Office of Saline Water of the United States Department of Commerce. In the instant invention, it has been discovered that a continuous system may be provided by circulating a slurry of ice crystals and water along an endless path which is substantially horizontal. The depth of slurry is relatively shallow to eliminate excessive hydrostatic head for the reason that an immiscible vaporizable organic liquid employed as a refrigeration agent for the saline water can vaporize only near the surface. Continuous admission of saline water to be refrigerated as fresh feed and continuous withdrawal of slurry preferably adjacent a dip portion in the slurry circulation path upstream from the fresh feed entry, enable the system to operate without interruption with relatively high efficiency and achievement of ice crystals of optimum character. Ice crystals of optimum character produced by this invention appear to have saline material thereon which is adherent rather than occluded therein for more effective washing in a known manner. Moreover such ice crystals are much more readily separable from the more concentrated saline water accompanying in the withdrawn slurry preparatory to such washing. Hence, when such washed ice is melted, better fresh water is obtained as a product.

In a preferred form of my invention I provide apparatus comprising, in combination, a substantially horizontal enclosed generally annular chamber or other arrangement for closed circulation, said chamber being relatively shallow and adapted to have a slurry of crystals and liquid circulated therein in a selected direction along an endless path defined by said chamber, said chamber having a downwardly extending portion adapted to make said slurry dip below the normal level of said path in the course of its flow therealong, means to circulate said slurry along said path positioned adjacent said portion, means for admitting liquid to be refrigerated on the down stream side of said last-named means, means for supplying an immiscible vaporizable liquid refrigerant into said slurry below the surface thereof and on the down stream side of said means to circulate, preferably adjacent said means for admitting liquid to said chamber, means to maintain temperature and pressure conditions within said chamber such that said vaporizable liquid refrigerant as aforesaid will rise through said slurry and vaporize to form additional crystals and augment the enlargement of the existing crystals in said slurry, said vaporized refrigerant rising to a vapor space in said chamber above the surface of said slurry, a vapor outlet for vaporized refrigerant positioned down stream of said means for supplying liquid and up stream of said means to circulate, and withdrawal means adjacent said portion below said normal level of said slurry in said chamber to withdraw a portion of said slurry with separable crystals therein corresponding in quantity to the quantity of material of liquid added by said means for admitting.

In the foregoing general statement I have set out certain purposes, objects and advantages of my invention. Other objects, advantages, and purposes of the invention will be apparent from the following description and the accompanying drawings, which are illustrative only, in which:

FIGURE 1 is a plan view of one embodiment of freezer apparatus of this invention utilizing single entry and outlet members;

FIGURE 2 is a view in elevation and cross section taken generally along line II—II of FIGURE 1;

FIGURE 3 is a partial view in section taken along line III—III of FIGURE 2;

FIGURE 4 is a partial view in section taken along line IV—IV of FIGURE 1;

Figure 6:
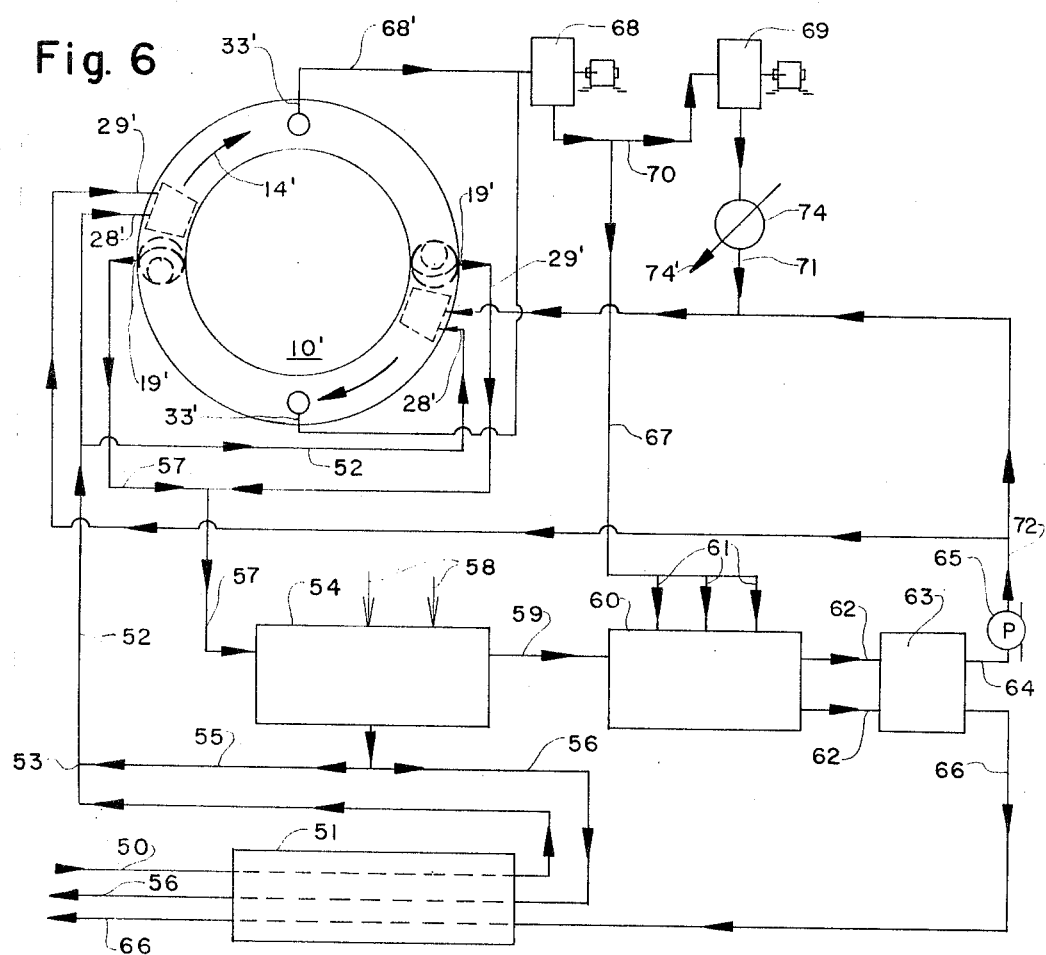
FIGURE 6 is a schematic flow diagram of a circuit utilizing an embodiment of the freezer system of this invention.

Referring to FIGURES 1 through 4 of the drawings, there is shown therein one embodiment of a freezer system of this invention for the recovery of usable fresh water from saline water such as sea water. The apparatus in that embodiment comprises a freezer 10 comprising a generally annular chamber 11 having walls formed by lengths of pipe of circular cross section arranged in a polygonal ring-like arrangement to provide an endless path for ice and water slurry extending around the interior 12. Such generally annular chamber may be polygonal, circular, oval or of other endless path shape when viewed in plan and the walls may be made of pipe, or of fabricated vessel construction, rectangular or otherwise in cross section and welded or otherwise fastened at the respective joints. Such generally annular chamber, further, may be covered with suitable insulating material when desired for thermal conservation purposes. The chamber may be supported on framing 9.

Device 10 is substantially horizontal except for a dip portion 13 which causes slurry 14 circulating through the horizontal interior 12 to dip downwardly from its normal horizontal level at surface 15 and then, in major part, to move upwardly for the resumption of its horizontal movement without interruption of the continuity of flow. A withdrawal pump 16 to withdraw a minor part of slurry is connected to the lower end of dip member 13. The minor part of slurry withdrawn contains desired ice particles of predetermined range in size in flowable admixture with more concentrated saline water in such withdrawn slurry resulting from the presence of such ice crystals. Slurry pump 16 is provided with an impeller 17 driven by a motor-reducer 18 to discharge a predetermined portion of the slurry through an outlet 19 in the bottom of dip member 13.

Dip or sump member 13 is a depending cylindrical vessel closed at its bottom except for outlet 19 and communicating with the freezer 10 through a crescent shaped opening ABCD on the downstream side of semi-cylindrical partition 20 extending across the interior of freezer 10. The partition 20 directs the moving slurry into a cylindrical sleeve 22 communicating at one end to the freezer 10 on the upstream side of partition 20 and open at the opposite end near the bottom of dip member 13 to deliver slurry into dip member 13. The cylindrical sleeve 22 extends downwardly from freezer 10 within dip member 13 and preferably off center of such member. The upper end of sleeve 22 intersects the bottom of pipe section 11a and defines a circular opening 24 therein on the upstream side of partition 20 which otherwise closes off the entire cross section of interior 12 in pipe section 11a. An impeller 25 is positioned for slurry circulation in the lower end of sleeve 22 and driven by a shaft 26 which in turn is rotated by a motor 27 when device 10 is in operation. The correlation between the amount of freezer slurry product plus recirculated brine withdrawn by slurry pump 16 and the speed of rotation of draft impeller 25 determines the quantity of slurry recycled in device 10 relative to the quantity of slurry product withdrawn from freezer 10 under stable operating conditions. The quantity withdrawn corresponds to the quantity of feed saline water, such as sea or brackish water, which is admitted to annular chamber 11 through an inlet 28.

An immiscible, vaporizable liquid refrigerating agent is supplied through an inlet pipe 29 to a trough or sparge 30 the upper edges of which are welded to the bottom of section 11b of the annular chamber 10 to complete the trough enclosure, communication between trough 30 and interior 12 of chamber 10 being provided by holes 31 in such bottom portion within the sealed periphery of trough 30. Consequently, as the refrigerant liquid, preferably butane or isobutane, is supplied through pipe 29, it will fill trough 30 and stream through openings 31 into the shallow body of slurry 14 in chamber 10. Such streams of refrigerating liquid will break up into particles and mix with the slurry. They tend to rise because of their lower specific gravity and the pressure and temperature conditions maintained in chamber 10. In rising, such refrigerant liquid particles will vaporize removing heat from the slurry and forming new ice crystals as well as augmenting the size of existing ice particles in the recycled ice and water slurry 14. A selected minor portion of the slurry 14 is withdrawn by slurry pump 16, sometimes not more than about 10% of the whole slurry thereat, depending upon the retention time desired in device 10. The withdrawn portion of the slurry contains ice crystals of readily separable size resulting from the substantial retention time provided by recirculation and the length of passage through chamber 10. The withdrawn slurry is discharged from the system through outlet 19. In the slurry throughout the freezer 10, the average quantity of ice relative to slurry is preferably in the weight proportion of about 25 percent to maintain a pumpable slurry. The non-withdrawn slurry returns as aforesaid through the crescent aperture ABCD to its horizontal path in chamber 11 and is augmented by the addition, continuously, of a corresponding quantity of saline water admitted through entry pipe 28. Such newly admitted saline water preferably is precooled by any of well known means.

Any given components of slurry may be recycled a predetermined number of times in device 100 to provide the desired retention time for the growth of most of the ice crystals to a size within the desired separation range before withdrawal. Such growth is augmented by the vaporization of the refrigerating agent within the slurry 14 and the passage of time because the temperature of the slurry is somewhat below the freezing point of the brine solution to further build up the size of the ice crystals as they circulate and recirculate in device 10 to the selected extent.

In a representative operation of freezer device 10, fresh sea water would be admitted through pipe 28 in a quantity such that the average weight of ice in the device would be about 25 percent, with water making up the remainder of the 100 weight percent save for the saline content which in the case of sea water feed averages between 3 and 4 percent by weight as a solute in solution in the water. As the slurry 14 circulates away from the entry member section 11b its temperature will tend to become lower returning to equilibrium when the recycle portion of the slurry passes through the dip member 13 and returns to the entry section 11b where it is joined by the less cold fresh feed entering at 28. A liquid refrigerating agent such as normal butane or isobutane is supplied through pipe 29. Little driving energy (pressure) in the refrigerating agent is required because the depth of the slurry 14 between the bottom of chamber 11 and surface 15 is relatively shallow preferably not exceeding about 24 inches, while the pressure in chamber 11 above surface 15 may, in the case of n-butane, be maintained at about 12.7 pounds per square inch absolute corresponding to about 2 pounds of vacuum created by any well known vacuum device connected by refrigerant outlet port 33 downstream from pipe 29. The length of chamber 10 preferably is proportioned such that the desired retention time of recycled components of slurry therein is provided, the flow rate for the slurry preferably being in the range of from about 3 to about 5 feet per second. The quantity of refrigerating agent admitted in the illustrative operation of device 10 will in the course of continuous operation with the selected recycling, freeze about 50 percent of the water content of the incoming sea water or considerably more brackish water admitted through pipe 28, although at any given place the ice content of the slurry as stated above will be in the neighborhood of about 25% by weight of ice. Most of the newly formed ice crystals, being too small for ready recovery, are augmented in size as they remain within the device 10 during such retention by virtue of the continuing vaporization of the refrigerating agent and their presence in the slurry at a temperature conducive to the formation of fresh water ice. It has been discovered that the ice crystals withdrawn through outlet 19 in the pumpable withdrawn slurry have their saline impurities adherent thereto, but not occluded therein. Hence, when such crystals are washed prior to melting the washed ice requires less non-saline water for washing and yields usable substantantially non-saline, or potable, water, as desired, upon melting.

Figure 5:
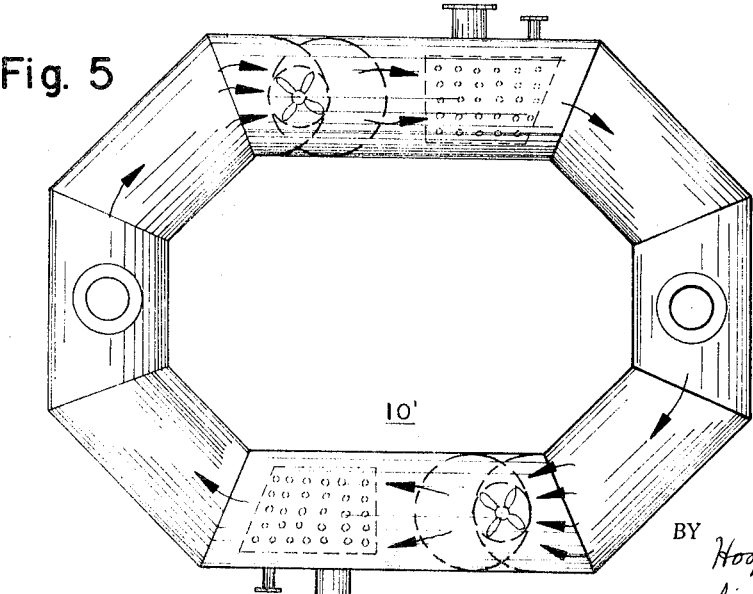
FIGURE 5 is a view of a further embodiment of this invention utilizing plural entry and outlet members.

The freezer apparatus illustrated in FIGURE 5 is similar to device 10 except that in lieu of single entry and withdrawal members, the modified embodiment of FIGURE 5 is larger and has multiple entry and withdrawal members. Parts in the FIGURE 5 embodiment corresponding in structure and functioning to parts shown in device 10 are respectively provided with the same reference numerals with the addition of a prime accent thereto.

For the optimum economy and efficiency, device 10, or 10', or other embodiments of this invention may be utilized in a fresh water ice making and recovery circuit such as that illustrated schematically in FIGURE 6. In FIGURE 6 a freezer embodiment corresponding to embodiment 10' but in circular form is utilized and given the same respective reference numerals as device 10'. In the flow circuit of FIGURE 6, let it be considered that fresh sea water feed enters the circuit at 50, passes through heat exchanger 51 where it is chilled and then proceeds through pipes 52 to both inlets 28' where it is discharged into the slurry 14' in the freezer 10'. At 53 the precooled fresh sea water feed may be joined by brine (including some of the water of the slurry withdrawn from the freezer) discharge from a washer 54, such brine discharge including some of the washing water leaving washer 54 passing out through pipe line 55 to be recycled, the remainder of the liquid discharge from washer 54 passing out through the line 56 as reject liquid through heat exchanger 51 for countercurrent flow heat exchange with the feed entering at 50.

The withdrawn slurry containing ice crystals of desired size leaves device 10' through the outlets 19' and from thence through pipes 57 is conducted to washer 54 which may, for example, be of the type shown in Wiegandt Patent No. 3,251,193 into which non-saline washing water is admitted through the pipes 58 to wash adherent saline impurities off such ice crystals, the washed ice then being conveyed through conduit 59 to a melter 60. At this point it may be remarked that no claim is made per se to the equipment and flow shown in FIGURE 6 beyond the boundaries of freezer 10', such auxiliary equipment being known in this art and previously disclosed by others.

In melter 60 vaporized refrigerant such as butane vapor at a pressure higher than that maintained in the freezer 10' is discharged through nozzles 61 into the washed ice mass causing such ice to melt into product water of materially lesser, or virtually no, salinity relative to the salinity of the entering sea water feed, and, further causing the vaporized refrigerant to reliquefy. Such product water and liquefied refrigerant are discharged from melter 60 through pipes 62 into a separator 63. In the case of butane, it being lighter in specific gravity than product water, such butane will rise to the top and can be decanted therefrom through outlet 64 leading to a pump 65. Fresh product water is discharged from separator 63 through a pipe 66 and, being relatively cold, exits through heat exchanger 51 so as to take up a certain portion of the heat yielded by the sea water feed passing therethrough in indirect heat exchange with both such product water and the reject brine. The vaporized refrigerating agent discharged through nozzles 61 is received through pipe 67 from a first-stage compressor 68 receiving vapor at a pressure somewhat lower than that of the freezer 10' through line 68' from outlets 33'. The portion of the refrigerating agent vapor from compressor 68 which can not be condensed in the melter 60 is passed through a pipe 70 to a second-stage compressor 69 where its pressure is raised to above the equilibrium condensing pressure so that upon discharge from compressor 69, the vapor is liquefied by passing through a condenser 74. Non-condensible gases are removed from the system by the vent line 74'. The liquid refrigerating agent discharged at 71 from condenser 74 joins the liquid refrigerating agent pumped by pump 65 through pipe 72 and its branches to the supply inlets 29' of device 10'. Thereby, after start-up, the entire refrigeration cycle and the operation is continuous.

Various other forms of the invention may be constructed such as, for example, an annular chamber 11 in which the dip portion slopes downwardly to a horizontal and then upwardly without being vertical, so that the slopes present a slant sided U-shape in elevation with, preferably, the bottom of the U being of smaller internal cross section than the cross section of the remainder of the annular chamber. Changes may be made in the illustrated embodiments including different spacings of the respective elements thereof, and, additional equipment may be utilized, if desired, such as a circulation booster and/or mixing blades positioned in the annular chamber around the periphery, or other equipment may be added for other purposes. Further, various correlative sets of operating conditions and ingredients may be utilized. All such are within the spirit of this invention and do not depart from the scope of the appended claims.

I claim:

1. In a saline water freezing system apparatus comprising, in combination, a substantially horizontal enclosed annular chamber, said chamber being relatively shallow and adapted to have a slurry of ice and saline water circulated therein in a selected direction along an endless path defined by said chamber, said chamber having a downwardly extending portion adapted to make said slurry dip below the normal level of said path in the course of its flow therealong, means to circulate said slurry along said path positioned adjacent said portion, means for admitting saline water to be refrigerated and recirculated brine separated from the slurry on the downstream side of said last-named means in said chamber, means for supplying an immiscible vaporizable liquid into said slurry below the surface thereof and on the downstream side of said means to circulate, preferably adjacent said means for admitting saline water and brine to said chamber, means to maintain temperature and pressure conditions within said chamber such that said vaporizable liquid as aforesaid will rise through said slurry and vaporize to form additional ice crystals and augment the size of existing ice crystals in said slurry, said vaporized liquid rising to a vapor space in said chamber above the surface of said slurry, a vapor outlet for vaporized liquid positioned downstream of said means for supplying and upstream of said means to circulate, and withdrawal means adjacent said portion to withdraw a portion of said slurry with separable ice crystals therein corresponding in quantity to the quantity of material of saline water and brine added by said means for admitting.

2. An apparatus as claimed in claim 1 wherein said downwardly extending portion is a vertical sump communicating with the upstream end of said chamber, an inner passageway communicating between the downstream side of said chamber and the lowermost portion of the sump and means to circulate said slurry in said sump.

3. An apparatus as claimed in claim 1 wherein the generally annular chamber is of octagonal shape.

4. An apparatus as claimed in claim 1 wherein the vaporizable organic liquid is a member of the class consisting of butane and isobutane.

5. An apparatus as claimed in claim 1 wherein the means to circulate slurry is a pump.

6. In a saline water freezing system, apparatus comprising, in combination, a substantially horizontal enclosed generally annular chamber, said chamber being relatively shallow and adapted to have a slurry of crystals and liquid circulated therein in a selected direction along an endless path defined by said chamber, said chamber having a downwardly extending portion adapted to make said slurry dip below the normal level of said path in the course of its flow therealong, means to circulate said slurry along said path positioned within said portion, means for admitting liquid to be refrigerated on the downstream side of said last-named means in said chamber, means for supplying an immiscible vaporizable liquid refrigerant into said slurry below the surface thereof and on the downstream side of said means to circulate, preferably adjacent said means for admitting liquid to said chamber, means to maintain temperature and pressure conditions within said chamber such that said vaporizable liquid refrigerant as aforesaid will rise through said slurry and vaporize to form additional crystals and augment the size of existing crystals in said slurry, said vaporized refrigerant rising to a vapor space in said chamber above the surface of said slurry, a vapor outlet for vaporized refrigerant positioned downstream of said means for supplying liquid and upstream of said means to circulate, and withdrawal means adjacent said portion below said normal level of said slurry in said chamber to withdraw a portion of said slurry with separable crystals therein corresponding in quantity to the quantity of material of liquid added by said means for admitting.

References Cited by the Examiner

UNITED STATES PATENTS

| | | | |
|---|---|---|---|
| 3,017,752 | 1/1962 | Findlay | 62—123 X |
| 3,170,779 | 2/1965 | Karnofsky | 62—123 X |

ROBERT A. O'LEARY, *Primary Examiner.*

W. E. WAYNER, *Assistant Examiner.*